Dec. 21, 1943.    E. J. COLE    2,337,372
METHOD OF MAKING SELF-LOCKING NUTS
Original Filed Sept. 2, 1942

Inventor
EDWARD J. COLE,
By Leech & Radue
Attorneys.

Patented Dec. 21, 1943

2,337,372

UNITED STATES PATENT OFFICE 2,337,372

METHOD OF MAKING SELF-LOCKING NUTS

Edward J. Cole, Peekskill, N. Y., assignor to Cole Machinery Mfg. Corp., a corporation of New York Original application September 2, 1942, Serial No. 457,086. Divided and this application August 7, 1943, Serial No. 497,815

5 Claims. (Cl. 10—86)

This invention relates to a method of producing a novel form of improved standard grip nut which is readily and economically made from all forms of standard nut blanks. This application is a division of my copending application Serial No. 457,086, filed September 2, 1942, entitled "Self-locking nuts."

The principal object of the invention is the production of nuts of the general type shown in my prior patents, No. 1,905,621, patented April 25, 1933, and No. 1,966,613, patented July 17, 1937, although the present nut is considerably simpler in structure and manufacture. In this instance, I am able to operate on conventional standard nut blanks of any desired form and to flare the upper portion of the nut blank bore and consequently spread the crown portion of the nut without cutting or splitting the crown, as disclosed in my prior patents.

The resultant improved standard grip nut produced by this method is standard in all respects, that is, the nut blank is conventional and, aside from the flaring and spreading step, the blank is tapped in a conventional screw tapping machine to form a standard thread therein followed by a compression of the flared and spread parts, so that the upper part of the threaded bore has threads of lesser depth than the remaining threads.

Referring to the accompanying drawing.

Figure 3:
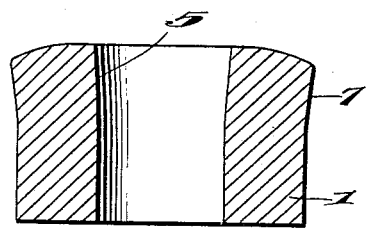
Fig. 3 illustrates the standard blank after the upper part of the bore has been flared and the upper portion of the crown spread.

Specifically, the present method relates to operating on a standard nut blank 1 of any desired size, shape, type, form or configuration which is bored, punched, or otherwise cut, to form a straight-sided bore 3 therein, after which the bored nut blank is processed to flare the upper portion 5 of the bore 3 and to spread the upper portion of crown 7 of the nut blank, as shown in Fig. 3. This flaring and spreading may be accomplished in any desired manner, either manually or by passing the blanks through a machine of the character described and claimed in my copending application, Serial No. 447,267, filed June 16, 1942. After the flaring and spreading operation, the blank 1 is screw threaded throughout the length of the bore and, due to the outward flare 5, the screw threaded portion 9 coincident with the length of the flared part 5 is of lesser depth than the lower screw threaded portion 11, where the bore is the same diameter as the originally formed bore.

Figure 4:
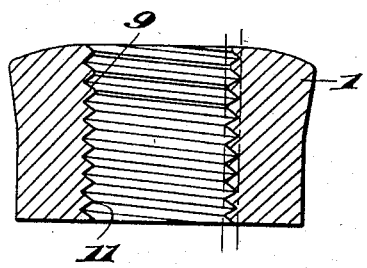
Fig. 4 is a section disclosing the flared and spread standard nut blank after it has been screw threaded or tapped on a conventional screw threading machine.
Figure 2:
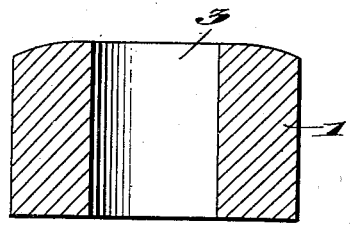
Fig. 2 is a vertical section showing the straight bore through the standard nut blank.

As shown in Fig. 4, the base line of the thread throughout the entire bore is in a vertical plane while the crest line of the thread is in a vertical plane throughout the unflared portion of the bore and follows the flare line in the flared portion of the bore. It will be observed that the crest of the thread in the unflared portion is a continuous sharp line or edge and the crest of the thread through the flared portion is progressively wider as the flare becomes more acute toward the crown of the blank.

Figure 1:
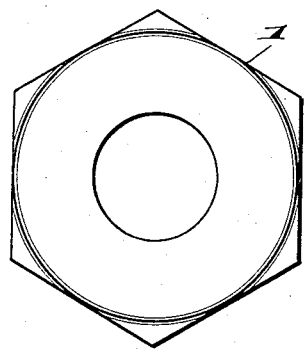
Fig. 1 is a top plan of a standard hexagonal grip nut blank, although it will be understood that the invention is equally adaptable for operation on square, wing, or other standard nuts.
Figure 5:
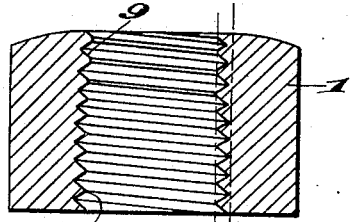
Fig. 5 illustrates the two depths of the threads which result from reforming or compressing the blank after it has been threaded.

Fig. 5 illustrates the threaded blank after the side walls thereof have been recompressed to place the exterior of the nut blank in identical form and size to the original blank disclosed in Fig. 1, and here the lesser depth of the screw threaded part 9 is clearly indicated in comparison to the greater depth of the threaded part 11 in the unflared section of the bore.

After compression, the base line of the thread in the unflared portion of the bore remains in a vertical plane while the base line in the flared portion assumes a similar form to that previously maintained by the flare. The crest line of the thread of the completed and compressed nut is then in a vertical plane throughout the entire bore.

Thus, when such an improved standard nut blank is applied to a bolt the blunt edge thread portion of the threading binds on the surfaces of the bolt thread and takes up all looseness or play therebetween. This formation also permits the flare and compression to vary when necessary to give an increased spring grip action.

Figure 6:
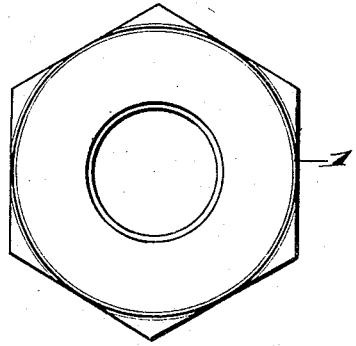
Fig. 6 is a top plan of the completed self-locking nut.
Figure 8:
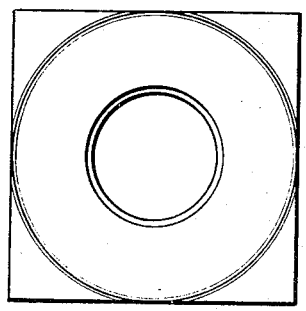
Fig. 8 shows a completed square nut produced by the present method.
Figure 7:
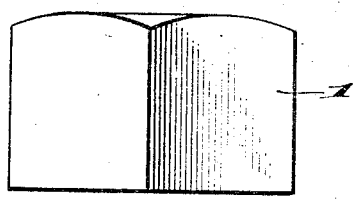
Fig. 7 is a side elevation of the completed nut illustrating its standard specifications.

Figures 6 and 7 illustrate the top and sides of the completed grip nut after it has been operated upon through the several method steps heretofore described and it will be appreciated that the exterior configuration is identical to a conventional standard screw threaded nut. In Fig. 8 a similarly completed standard four-sided or square nut is shown after passing through the steps of this method.

As before stated, the type of nut blank is immaterial as the present method and grip or binding nut formed thereby may be of any desired kind and size.

What I claim is:

1. The method of producing an improved nut which consists in spreading the metal of a nut blank at one end of its unthreaded bore to uniformly and continuously flare the end of the bore and the upper side portions of the blank, screw threading the bore and thereby forming threads of lesser depth at the flared and spread end of the bore, and wherein the root of the thread lies in a cylindrical surface, every element of which lies in a straight line perpendicularly of the working face of the nut blank, and finally compressing the continuous spread side portions of the blank and flared end of the bore to bring the crest line of the thread into vertical alinement throughout the bore.

2. The method of producing grip nuts as set forth in claim 1 wherein the final compressing step returns the nut blank to its original external dimensions.

3. The method of producing a standard grip nut which consists in spreading the metal of the nut blank at one end of its unthreaded bore to laterally and uniformly flare the end of the bore and the upper side portions of the blank, screw threading the bore and thereby forming threads of lesser depth at the spread and flared end of the bore, and finally compressing the continuous spread side portions of the blank and flared end of the bore sufficiently to bring the inner diameter of the threads at said previously flared end of the bore to substantially the same diameter as the inner diameter of the remaining threads.

4. The method of producing a grip nut from a standard nut blank which comprises boring said blank, uniformly spreading the crown portion of the blank, tapping an uninterrupted screw thread of equal pitch throughout the entire length of said bore in one continuous step, the root of the thread being in a single cylindrical surface and thereafter compressing the continuous spread crown portion of the nut blank to its original standard outer configuration whereby the crest of the thread is in the same cylindrical surface perpendicular to the base of the nut blank and the thread in the crown portion thereof is of less depth.

5. The method of producing a grip nut from a standard nut blank which comprises the steps of forming a uniform diameter bore through said blank from base to crown thereof, increasing the diameter of said bore at one end thereof, screw threading the entire length of the bore with an uninterrupted thread so that the root of the thread thus formed lies in a single cylindrical surface normal to the base of the blank and thereafter returning the continuous increased diameter portion of the bore to the diameter of the remaining portion thereof to bring the crest line of the uninterrupted thread into vertical alignment throughout the entire length of the bore and simultaneously return the exterior of the blank to its original standard dimensions.

EDWARD J. COLE.